United States Patent [19]

Goldfuss

[11] 3,905,243

[45] Sept. 16, 1975

[54] LIQUID-LEVEL SENSING DEVICE
[75] Inventor: George T. Goldfuss, Joliet, Ill.
[73] Assignee: The United States of America as represented by the United States Energy Research and Development Administration, Washington, D.C.
[22] Filed: Sept. 11, 1973
[21] Appl. No.: 396,339

[52] U.S. Cl. .............................. 73/295; 340/244 R
[51] Int. Cl.² ................... G01F 23/22; H01L 35/00
[58] Field of Search ..... 73/295; 176/19 R; 219/209; 340/244 R; 338/23, 28

[56] References Cited
UNITED STATES PATENTS

| | | | |
|---|---|---|---|
| 3,118,136 | 1/1964 | Steele | 73/295 X |
| 3,217,543 | 11/1965 | Van Haagen | 73/295 X |
| 3,230,772 | 1/1966 | Leslie et al. | 73/362 AR |
| 3,279,252 | 10/1966 | Barlow | 73/295 |
| 3,280,627 | 10/1966 | Cousins et al. | 73/295 |
| 3,302,458 | 2/1967 | Scadron | 73/295 |
| 3,360,990 | 1/1968 | Greene et al. | 73/295 |
| 3,485,100 | 12/1969 | Petersen | 338/23 X |

Primary Examiner—Richard C. Queisser
Assistant Examiner—Frederick Shoon
Attorney, Agent, or Firm—John A. Horan; Arthur A. Churm; John L. Isaac

[57] ABSTRACT

This invention involves a device for sensing the level of a liquid while preventing the deposition and accumulation of materials on the exterior surfaces thereof. Two dissimilar metal wires are enclosed within an electrical insulating material, the wires being joined together at one end to form a thermocouple junction outside the insulating material. Heating means is disposed within the electrical insulating material and maintains the device at a temperature substantially greater than that of the environment surrounding the device, the heating means being electrically insulated from the two dissimilar thermocouple wires. In addition, a metal sheath surrounds and contacts both the electrical insulating material and the thermocouple junction. Electrical connections are provided for connecting the heating means with a power source and for connecting the thermocouple wires with a device for sensing the electrical potential across the thermocouple junction.

1 Claim, 4 Drawing Figures

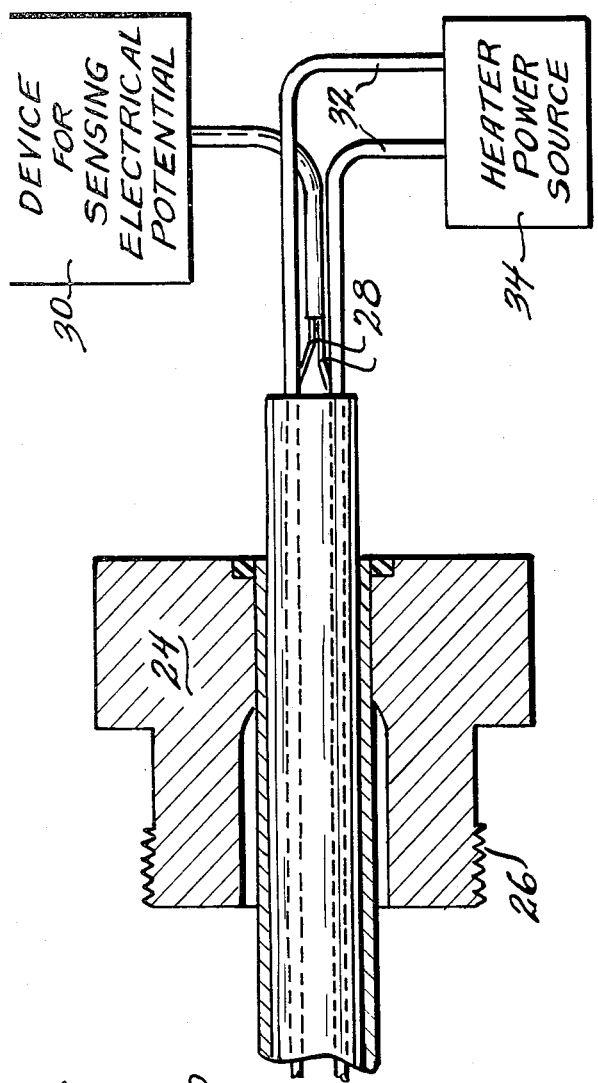
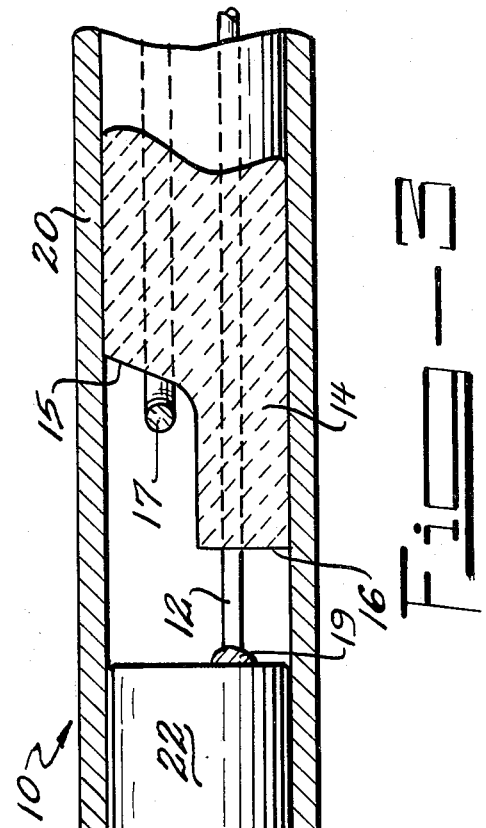
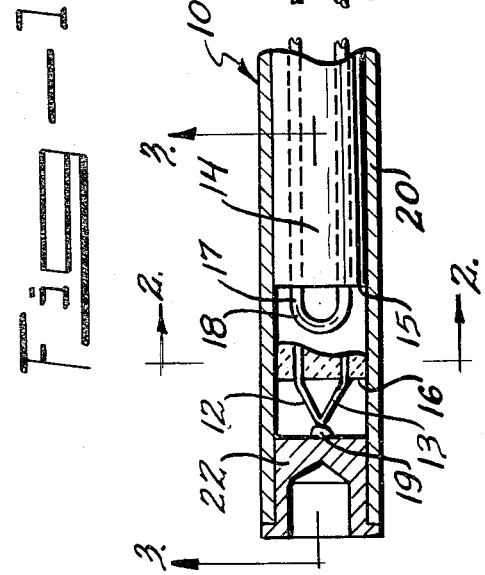
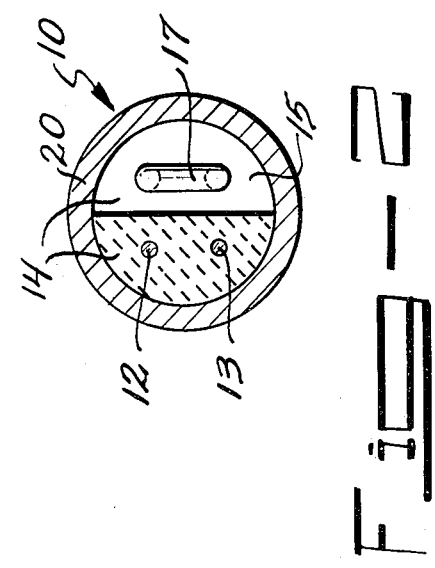

LIQUID-LEVEL SENSING DEVICE

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a device for sensing the level of a liquid. More specifically, the invention relates to a device for sensing the level of a high-temperature liquid while preventing the deposition and accumulation of condensation products on the exterior surfaces of the device. In particular, this invention relates to a device for determining the level of molten sodium in a liquid-sodium-cooled nuclear reactor, particularly in the cover gas enclosure thereof, while operating at a temperature considerably above that of either the sodium or the cover gas.

When working with various liquids and especially liquid metal, it is highly desirable to be able to determine the level of the liquid within the container in which the liquid is situated. This is especially true for the level of liquid sodium within various portions of a sodium-cooled nuclear reactor, including the cover gas enclosure thereof. This has normally been achieved in the past by inserting a number of thermocouple probes, aligned vertically, into the container which holds the liquid, the thermocouples within these probes being sensitive to the temperature of the liquid. When the liquid comes into contact with one of the probes, the electrical output of the thermocouple within that probe so indicates such contact. If the level of the liquid within the container should rise, the liquid will come into contact with succeeding probes, and the electrical outputs from the thermocouples within these successively contacted probes indicate this rise as well as the particular probe level which the sodium has achieved. In the past, these probes have generally operated at ambient temperatures.

One of the more persistent problems which has been encountered when utilizing such probes, especially with liquid metal, has been the formation of oxides or the plating out of metal on the probes' exterior surfaces. This problem occurs when a probe or any part thereof is situated above the level of the liquid and is therefore in continual contact with the liquid vapor. The liquid vapor condenses on the probe's exterior metal surface and either oxidizes the metal or, as is especially true in the case of liquid metal vapor, plates out so as to form deposits thereon. Such deposits and coatings change the probe readings and increase probe error, and if the oxidation or deposition is severe enough, they can render the probe inoperable.

Accordingly, there is a need for a sensing probe which will minimize the deposition and coating by materials from the atmosphere wherein the probe is located. The inventor has devised such a probe or sensing device which prevents the condensation or deposition of material on its exterior surface while being capable of sensing the level of the liquid within the container wherein the device is situated. The basic principle which enables the subject sensing device to prevent such condensation and deposition is that the device is maintained at a temperature substantially above that of the liquid and the atmosphere above the liquid. When the liquid within the container rises so as to contact the present device, which contains a thermocouple, heat is dissipated out from the sensing device into the liquid. This heat dissipation lowers the temperature of the thermocouple within the sensing device thereby reducing the electrical potential across the thermocouple junction. This reduction in electrical potential is measured and indicates that the liquid has obtained the level of that particular sensing device. In addition, any of the sensing devices or portions thereof which are not in contact with the liquid maintain a temperature substantially above that of the liquid and the atmosphere above the liquid, and this temperature differential prevents the formation of oxides or deposition of metal on the exterior surfaces thereof.

Therefore, it is one object of the present invention to provide a device for sensing the level of a liquid.

It is another object of the present invention to provide a liquid-level sensing device which prevents the accumulation and deposition of condensation products thereon.

It is finally an object of the present invention to provide a liquid-level sensing device for use in determining the level of sodium coolant within various portions of a liquid-sodium-cooled nuclear reactor while preventing the condensation and deposition of sodium on the exterior surfaces of the sensing device.

SUMMARY OF THE INVENTION

This invention is a liquid-level sensing device which operates at a high temperature so as to prevent the deposition and accumulation of condensation products thereon. Two dissimilar metal wires are enclosed within and extend the length of a solid, cylindrical, electrical insulator, the wires being joined together outside one end of the cylinder so as to form a thermocouple junction. In addition, a high-resistance heating wire is disposed within the cylinder for the purpose of maintaining the entire device at a temperature substantially above that of the surrounding environment, the heating wire being electrically insulated from the two dissimilar metal thermocouple wires. A metal sheath surrounds the cylinder and consists of a metal tube which encloses the exterior cylindrical surface of the insulator and a metal plug which seals one end of the metal tube and contacts the thermocouple junction. Finally, electrical connections are provided for joining the heating wire to a source of electrical current as well as for joining the thermocouple wires to a device which senses the thermally generated electrical potential across the thermocouple junction.

BRIEF DESCRIPTION OF THE DRAWINGS

FIG. 1 is a longitudinally sectioned view of a device constructed in accordance with the present invention.

FIG. 2 is a sectional view of line 2—2 of the device illustrated in FIG. 1.

FIG. 3 is a sectional view of line 3—3 of the device illustrated in FIG. 1.

DETAILED DESCRIPTION OF THE INVENTION

Figure 4:
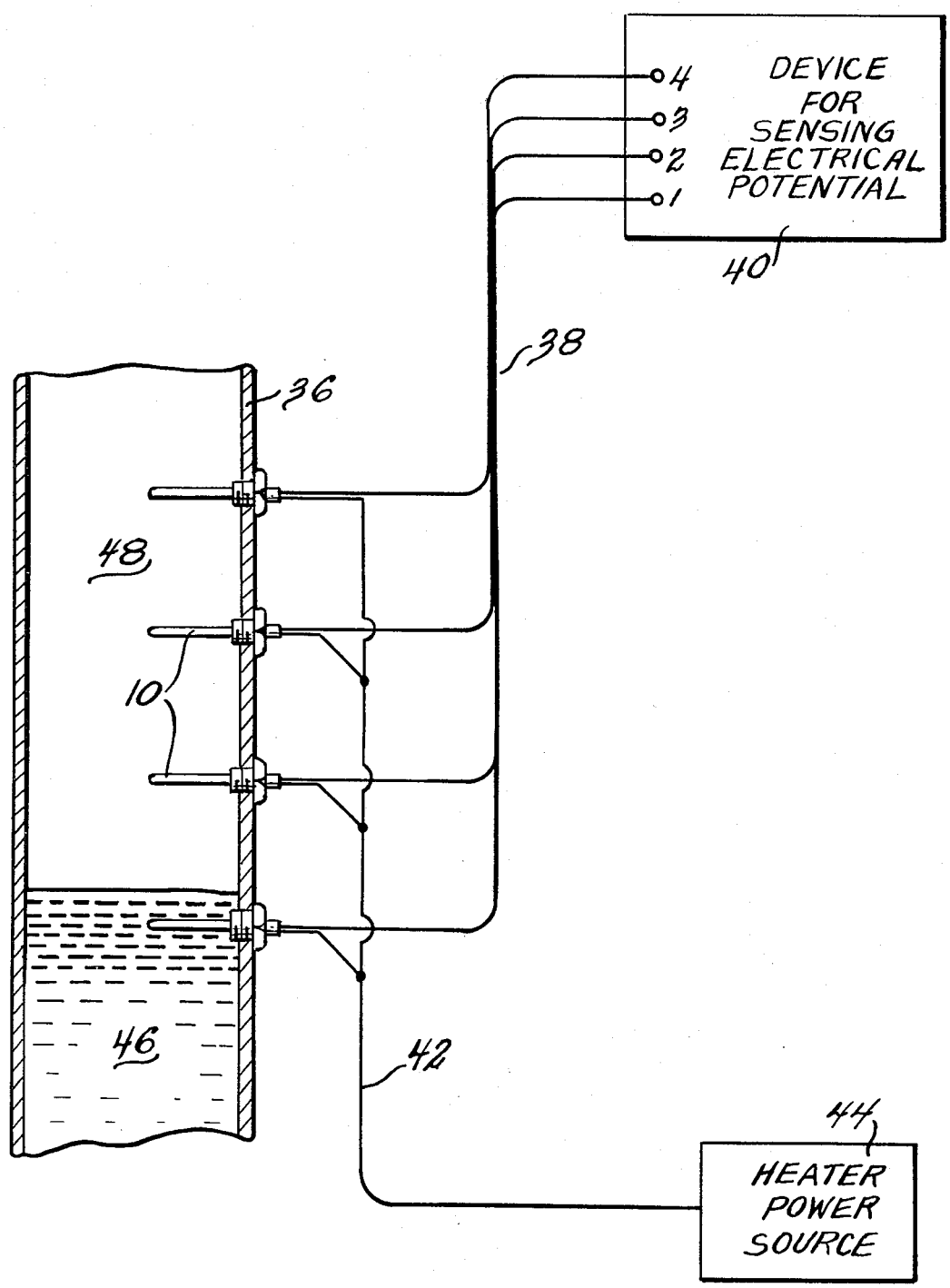
FIG. 4 is a schematic illustrating a plurality of devices constructed in accordance with the present invention mounted so as to determine the level of a liquid within a container.

Turning first to FIG. 1, there is shown a liquid-level sensing device 10 comprising dissimilar metal thermocouple wires 12 and 13 enclosed within electrical insulating material 14. While material 14 can be selected from any appropriate electrical insulating material capable of withstanding the high temperature of operation, it is preferred that material 14 comprise a solid, ceramic cylinder having a recessed surface 15 and a land surface 16. Also disposed within insulator 14 is a high-resistance heater wire 17, which is separated and insulated from thermocouple wires 12 and 13 and has a looped section 18. Thermocouple wires 12 and 13 protrude beyond one end of insulator 14 where they are joined together so as to form a thermocouple junction 19. Insulator 14 is snugly slip-fitted within and surrounded by metal tube 20 which has metal plug 22 welded to the end thereof, metal plug 22 being in electrical contact with both thermocouple junction 19 and metal tube 20. In order that device 10 may be securely mounted within a container (not shown), metal housing 24 having helical-shaped threads 26 is secured around the exterior surface of the end of tube 20 opposite the end containing plug 22. In this manner, device 10 may be inserted through an appropriately sized hole in a container and secured therein by engaging housing 24 and threads 26 with the wall of the container. In addition, electrical leads 28 connect thermocouple wires 12 and 13 to a device 30 which senses the electrical potential across thermocouple junction 19. Electrical leads 32 connect heater wire 17 to a power source 34 which generates the current within heater wire 17.

FIG. 2 is a sectional view of line 2—2 of one portion of the device illustrated in FIG. 1. Ceramic insulating material 14 is snugly fitted within and surrounded by metal tube 20. Disposed within insulator 14 are dissimilar metal thermocouple wires 12 and 13. Also disposed within insulator 14 is the high-resistance heater wire 17 which is electrically insulated from wires 12 and 13 by the material of insulator 14. Furthermore, in the preferred embodiment illustrated in FIGS. 1 and 2, heater wire 17 forms a loop protruding beyond recessed surface 15 in order to simplify construction of device 10 as explained below.

FIG. 3 is a sectional view of line 3—3 of the device illustrated in FIG. 1. The cylindrical exterior surface of material 14 is surrounded by metal tube 20, and thermocouple wire 12 protrudes beyond land surface 16 to form thermocouple junction 19 with thermocouple wire 13 (not shown). Metal plug 22 securely seals the end of tube 20 while contacting thermocouple junction 19. Clearly shown is heater wire 17 protruding beyond ceramic material 14 at recessed surface 15, thereby enabling easy construction of device 10 yet insuring separation of heating wire 17 from thermocouple wires 12 and 13 (not shown), metal tube 20 and metal plug 22.

FIG. 4 depicts a series of liquid-level sensing devices 10 mounted vertically within and secured to the wall of a container 36. Electrical leads 38 connect the thermocouple wires within each liquid-level sensing device to device 40 which senses the electrical potential across the thermocouple junction of each device 10. Electrical leads 42 connect the high-resistance heating wires within each device 10 to a power source 44 which supplies current to the heating wires. Located within container 36 is a liquid 46, for example liquid sodium. As the liquid 46 rises within container 36, it comes into contact with one or more devices 10 depending upon the particular height obtained by the liquid 46 within container 36. With the devices 10 being maintained at a temperature considerably above that of the liquid 46 or atmosphere 48, condensation deposits on the outer surfaces of devices 10 are prevented. When the liquid 46 contacts a device, such as illustrated by the lowermost device 10 in FIG. 4, heat is dissipated into the liquid from the device, thereby lowering the temperature of the thermocouple wires within that particular device. When the temperature of the thermocouple wires is lowered, the electrical potential which is thermally generated across the thermocouple junction decreases, and this decrease is sensed by device 40. This change in the electrical potential output indicates that the liquid has contacted that particular device 10 and has therefore obtained the particular level within container 36 at which that particular device 10 is located. As liquid 46 rises further within container 36, it contacts additional devices 10. The changes in the thermocouple outputs of these additional devices 10 indicate the rise in liquid 46 as well as the approximate level of liquid 46 within container 36.

Referring back to FIG. 1, thermocouple wires 12 and 13 consist of two dissimilar metal wires which are joined together at thermocouple junction 19, a heliarc junction being preferred. While it is further preferred that wires 12 and 13 are constructed from a Ni-Cr alloy such as Chromel (a registered trademark for an alloy comprising 35–90% Ni and 10–20% Cr) and a Ni-Al alloy such as Alumel (a registered trademark for an alloy comprising 94% Ni, 4% Al, 1% Si and 1% Mn), any of the metals normally utilized in the construction of thermocouples may be utilized with the present invention, including constantan, tungsten, iron and even precious metal alloys such as platinum-rhodium. When the liquid-level sensing device is heated to operating temperature, the increase in temperature and dissimilarity between the two metal thermocouple wires result in the generation of an electrical potential across the junction of the two wires. This potential is measured by device 30. Once the liquid-level sensing device has obtained operating temperature, the electrical potential generated by the thermocouple remains constant so long as the temperature of the surrounding environment also remains constant. When the heated device, secured within the container, comes into contact with a cooler liquid, however, heat is dissipated out from the device into the liquid, thereby bringing the temperature of the thermocouple closer to that of the liquid. This decrease in the thermocouple temperature results in a decrease in the electrical potential across the thermocouple junction. This decrease in potential is sensed by device 30 and thereby indicates that the level of the liquid has reached the particular level at which the liquid-level sensing device is located. It should be noted that the thermocouple junction is in contact with the metal plug located at the one end of the metal sleeve in order to obtain as quick a thermocouple temperature change as possible when the sensing device comes into contact with the liquid.

While any means may be employed to heat the subject device, the preferred method of heating, as illustrated in FIG. 1, is by incorporating a high-resistance heating wire within the insulating material containing the thermocouple wires. The specific diameter, length and material composition of the heating wire are dependent on the particular configuration chosen for the liquid-level sensing device. It is preferred, however, that a Ni-Cr-Fe alloy such as Nichrome (a registered trademark for an alloy comprising 15–16% Cr, 59–62%

Ni, about 24% Fe and 0.1% C) be utilized for the high-resistance heating wire. This wire is connected to a power source which supplies the current to the wire, the specific amperage being dependent upon the electrical resistance of the wire, the length of the wire and the temperature to which the sensing device is to be heated.

As indicated previously, the electrical insulating material which encloses the thermocouple wires and the heating wire can be selected from any material which performs the function of separating and insulating these wires and which can withstand the temperature to which the liquid-level sensing device is to be heated. It is preferred, however, that the electrical insulating material be a solid, ceramic material such as a refractory or other non-metallic structural material for use at high temperatures formed into a cylinder and having appropriate ducts for the heating and thermocouple wires. It is specifically preferred that vitrified alumina be utilized as the electrical insulating material. Ceramic materials, and particularly refractories, are preferred because they are convenient and can be reused if the thermocouple wires or heating wire should ever become damaged. In addition, the electrical insulating material preferably should offer low thermal resistance in order that heat may readily flow across its thickness. Good heat conduction through the electrical insulating material allows the temperature of the sensing device and the thermocouple to change rapidly when the sensing device is subjected to a cooler environment such as a liquid. Finally, for quick response of the present invention, it is preferred that both the electrical insulating material and the metal tubing surrounding this material be maintained as thin as possible in order to minimize the heat capacity of the sensing device.

The metal sheath, consisting of the metal tubing and metal plug, which surrounds the ceramic insulator and thermocouple junction may be selected from any material known to the art which is corrosion resistant to the environment to which the liquid-level sensing device will be subjected. In addition, it is also preferred that the metal chosen be one which is a good heat conductor in order to insure rapid response of the sensing device. When the liquid whose level is to be measured is a molten metal and specifically molten sodium, it is preferred that the metal sheath be constructed from stainless steel, specifically Types 304 or 316, for such stainless steels are highly resistant to molten metal. In addition, these stainless steels can readily withstand the thermal stresses which will result from the difference in temperature between that of the sensing device and that of the liquid environment.

It should be noted that the metal housing which is mounted about the exterior surface of one end of the metal tube is merely for the purpose of securing the liquid-level sensing device within a container. Any manner of securing the sensing device within such a container, however, is within the scope of the present invention. Furthermore, the device utilized for sensing the electrical potential across the thermocouple junction as well as the particular power source utilized to supply current to the heating wire may be selected from any of those known to the art. In testing the present invention, however, a variable transformer was utilized as the heater wire power source to control the temperature of the liquid-level sensing device, and a millivoltmeter was utilized to measure the electrical potential output.

The particular temperature at which the liquid-level sensing device is operated is dependent upon the particular temperature of the liquid whose level is to be determined as well as upon the temperature of the gaseous environment above the liquid. In general, it has been found that a liquid-level sensing device temperature of 200°–600°F. greater than that of the temperature of the surrounding environment results in a rapid response by the device. When the temperature of the sensing device was about 200°F. greater than that of the environment, the device responded in about 2 seconds after coming into contact with the liquid, and when the temperature differential was about 600°F., the response time was approximately 1 second. In addition, a liquid-level sensing device temperature of about 200°F. or more higher than the temperature of the surrounding environment completely prevented the deposition of condensation products on and the oxidation of the exterior surfaces of the present invention, thereby preventing short-circuiting and/or insulation of the liquid-level sensing device.

The body of the liquid-level sensing device may be fabricated in any convenient shape, although the actual shape of the device may be dependent on how the device is to be heated as well as how it is to be supported. It is preferred that the shape of the device be a small, elongated cylinder, having a portion of one end recessed, with convenient dimensions being about 4 inches to 6 inches in length with an over-all outer diameter of about ⅛ inch. When a solid, cylindrical ceramic body is to be utilized as the electrical insulating material, a convenient method for fabricating the preferred embodiment of the present invention is to form four longitudinal tubular ducts within the ceramic body. A portion of one end of the ceramic body through which two of the ducts pass is then machined away so as to recess the openings of these two ducts at this one end and thereby shorten the length of these two ducts. This forms an unmachined land surface in which the two longer ducts have apertures and a recessed surface in which the two shorter ducts have apertures, as illustrated in FIG. 3. The two ends of the heating wire are then inserted into the two recessed openings of the shorter ducts and passed entirely through these ducts so as to create a small loop with the heating wire between the two recessed openings. The thermocouple wires are inserted into and passed through the two longer ducts and then joined together to form a thermocouple junction exterior to the land surface. In this manner, the thermocouple wires and heating wire may be easily disposed within the ceramic body, thereby eliminating the necessity of actually forming the ceramic body around a completely enclosed, internal heating wire. This particular embodiment and method of formation also facilitate the easy removal and replacement of any of the wires if necessary. This entire ceramic body containing the heater wire and thermocouple wires is then slip-fitted into the interior of the metal sleeve.

In operation, the liquid-level sensing device of the present invention is inserted into a container in which is located the liquid whose level is to be determined and monitored. This is conveniently done by drilling a hole in the wall of the container, inserting the sensing device therethrough, and then screwing the threaded metal housing attached to the exterior metal sleeve of the sensing device into this hole so as to securely position the sensing device within the interior of the container. The body of the device is then heated, utilizing the heating wire and the power source, to a temperature of about 200°–600°F. greater than the temperature of the atmosphere above the liquid in the container. Having obtained such a temperature, the electrical potential output, in millivolts, of the thermocouple is then noted. If the temperatures of the liquid-level sensing device and of the environment surrounding the device are maintained fairly constant, the millivolt output of the thermocouple will not change. However, when the liquid within the container rises so as to contact the sensing device, heat from the sensing device and the thermocouple therein rapidly flows toward the cooler liquid and therefore lowers the temperature of the thermocouple within the device. This lowering of the temperature of the thermocouple decreases the electrical potential across the thermocouple junction and thereby decreases the millivolt output of the thermocouple. A decrease in the thermocouple output, therefore, indicates that the liquid within the container has reached the level of and is in contact with the liquid-level sensing device. Furthermore, any liquid-level sensing device or portion thereof which remains located above the level of the liquid will continue to maintain a temperature of 200°–600°F. greater than the temperature of the atmosphere above the liquid. This temperature differential prevents the deposition or condensation of vapor on the outer surfaces of these liquid-level sensing devices. Consequently, the outer surfaces of such devices will not accumulate deposits thereon, thereby preventing short-circuiting of these devices as well as preventing the insulation thereof.

One of the preferred embodiments of the present invention, as described above, was tested by inserting it into a container having heated water located therein. The sensing device was heated to operational temperature, and the millivolt output of the thermocouple located within the device was noted. Upon contact of the water with the device, the sensing device quickly responded to such contact by a decrease in its millivolt output. In addition, there was no accumulation of deposits on the outer surfaces of this device. Table I indicates the results from the sensing device in this test, showing the amperage of the current which led to the four ohm nichrome heating wire within this particular sensing device. In addition, Table I shows the operating temperature of the liquid-level sensing device, the temperature of the liquid within the container, the temperature of the atmosphere above the liquid, and the response time of the device to contact with the liquid, that is, the time which elasped between the contact with the liquid and the decrease in the millivolt output of the device.

TABLE I

| Current to Heating Wire, Amps. | Temp. of Sensing Device | Temp. of Liquid (H$_2$O) | Temp. of Gas above Liquid | Response Time of Sensing Device |
|---|---|---|---|---|
| 2 | 360°F. | 190°F. | 73°F. | 2 sec |
| 2 | 650°F. | 190°F. | 73°F. | 1 sec |
| 3 | 762°F. | 190°F. | 73°F. | 1 sec |

In another series of tests utilizing the liquid-level sensing device of the present invention, four of the preferred embodiments were located within a container which was a part of a liquid sodium system. Static liquid sodium was located within the container, although the level of the sodium within the container varied according to the flow rate of the sodium throughout the remaining part of the sodium system. As the sodium flow rate was increased throughout the system, the level of the sodium within this particular container was raised. Four liquid-level sensing devices were inserted into the container one above the other. The temperature of the sodium as well as the temperature of the liquid-level sensing devices were varied during this testing, and the sensing devices operated as expected. When the sodium came into contact with each individual liquid-level sensing device, the millivolt output from the thermocouple within that particular device decreased, thereby indicating that the level of the sodium within the container had obtained the level of that particular sensing device. Furthermore, throughout this entire testing the outer surfaces of all the sensing devices within the container remained free of any deposits or condensates. Therefore, the present invention was highly successful in detecting the level of the sodium within the container while eliminating the problem of oxide formation or metal deposition on the exterior surfaces of the liquid-level sensing devices.

It will be understood that the invention is not to be limited to the details given herein but that it may be modified within the scope of the appended claims.

The embodiments of the invention in which an exclusive property or privilege is claimed are defined as follows:

1. A device for sensing the level of a liquid, comprising:

two dissimilar metal wires enclosed within and protruding from one end of an electrical insulating material, the protruding ends of said wires being joined together to form a thermocouple junction;

a heating wire for maintaining said liquid-level sensing device at a temperature above that of the environment above the liquid, said heating wire being disposed with said electrical insulating material and electrically insulated from said dissimilar metal wires, said insulating material being in the form of a solid ceramic cylinder having a land surface and a recessed surface at one end thereof, there being two tubular ducts passing longitudinally through said cylinder to form apertures in said land surface and two tubular ducts passing longitudinally through said cylinder to form apertures in said recessed surface, the ducts forming apertures in said recessed surface being shorter than the ducts forming apertures in said land surface, said heating wire being disposed within the two shorter ducts and forming a U-shaped loop exterior to and between the apertures in said recessed surface, each of said dissimilar metal wires being disposed within one of the two longer ducts;

a tubular metal sheath having an inside diameter larger than the outside diameter of said cylindrical insulating material thereby allowing said cylindrical insulating material to be slip fitted into said tubular sheath;

a solid metal plug securely sealing one end of said tubular metal sheath and in contact with said thermocouple junction;
electrical connections between said heating wire and a power source for activating said heating wire; and electrical connections between said dissimilar metal wires and a device for sensing the electrical potential across said thermocouple junction.

* * * * *